US007620010B2

(12) United States Patent
Takeda et al.

(10) Patent No.: US 7,620,010 B2
(45) Date of Patent: Nov. 17, 2009

(54) WIRELESS COMMUNICATIONS APPARATUS, AND ROUTING CONTROL AND PACKET TRANSMISSION TECHNIQUE IN WIRELESS NETWORK

(75) Inventors: Shinji Takeda, Yokohama (JP); Kengo Yagyu, Yokohama (JP); Atsushi Fujiwara, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 505 days.

(21) Appl. No.: 11/105,429

(22) Filed: Apr. 14, 2005

(65) Prior Publication Data
US 2005/0237973 A1 Oct. 27, 2005

(30) Foreign Application Priority Data
Apr. 14, 2004 (JP) ............................. 2004-119288

(51) Int. Cl.
H04W 40/02 (2006.01)
(52) U.S. Cl. ....................................... 370/328; 709/241
(58) Field of Classification Search ......... 370/229–238, 370/332, 338; 709/235, 239
See application file for complete search history.

(56) References Cited

U.S. PATENT DOCUMENTS

| | | | | |
|---|---|---|---|---|
| 6,034,946 A * | 3/2000 | Roginsky et al. | ............ | 370/238 |
| 6,452,933 B1 * | 9/2002 | Duffield et al. | ............ | 370/415 |
| 6,493,318 B1 * | 12/2002 | Bare | ............ | 370/238 |
| 6,658,479 B1 * | 12/2003 | Zaumen et al. | ............ | 709/238 |
| 7,000,061 B2 * | 2/2006 | Varma et al. | ............ | 710/310 |
| 7,031,288 B2 * | 4/2006 | Ogier | ............ | 370/338 |
| 7,046,665 B1 * | 5/2006 | Walrand et al. | ............ | 370/392 |
| 7,159,035 B2 * | 1/2007 | Garcia-Luna-Aceves et al. | . | 709/241 |
| 7,464,166 B2 * | 12/2008 | Larsson et al. | ............ | 709/228 |
| 2002/0061001 A1 | 5/2002 | Garcia-Luna-Aceves et al. | | |
| 2002/0176363 A1 | 11/2002 | Durinovic-Johri et al. | | |
| 2003/0118027 A1 | 6/2003 | Lee et al. | | |

(Continued)

FOREIGN PATENT DOCUMENTS

EP 1 257 096 A2 11/2002

(Continued)

OTHER PUBLICATIONS

Sung-Ju Lee, et al., "Dynamic Load-Aware Routing in Ad hoc Networks", Proc. ICC 2001, Jun. 2001, pp. 3206-3210.

(Continued)

*Primary Examiner*—Kwang B Yao
*Assistant Examiner*—Alex Skripnikov
(74) *Attorney, Agent, or Firm*—Oblon, Spivak, McClelland, Maier & Neustadt, L.L.P.

(57) ABSTRACT

A wireless communications apparatus used in a wireless communications network consisting of multiple wireless communications apparatuses mutually connected via wireless links includes (a) a buffer configured to temporarily store information received from an adjacent wireless communications apparatus or a user terminal located under the wireless communications apparatus; (b) a routing control information processing unit that estimates a node cost representing traffic at the wireless communications apparatus and a link cost representing a radio condition of the link to determine a transmission route based on cost information reflecting both the node cost and the link cost; and (c) a routing control unit that designates a next hop to which information accumulated in the buffer is to be transmitted according to the determined transmission route.

8 Claims, 6 Drawing Sheets

U.S. PATENT DOCUMENTS

| | | |
|---|---|---|
| 2003/0128687 A1 | 7/2003 | Worfolk et al. |
| 2003/0134644 A1 | 7/2003 | Reed et al. |
| 2004/0029528 A1 | 2/2004 | Chandler |
| 2005/0249121 A1 | 11/2005 | Matsunaga |

FOREIGN PATENT DOCUMENTS

| | | |
|---|---|---|
| JP | 07-087115 | 3/1995 |
| JP | 2000-69046 | 3/2000 |
| JP | 2000-78147 | 3/2000 |
| JP | 2002-368772 | 12/2002 |
| JP | 2003-188811 | 7/2003 |
| JP | 2003-309508 | 10/2003 |
| WO | WO 00/39967 | 7/2000 |
| WO | WO 02/078229 A1 | 10/2002 |
| WO | WO 03/098885 A1 | 11/2003 |

OTHER PUBLICATIONS

Jun-ichi Hakoda, et al., "Performance Evaluation of Mobile Ad Hoc Routing Protocols based on link Expiration Time and Load of Node", IEICE Journal, vol. J85-B, No. 12, Dec. 2002, pp. 2108-2118 (with partial English translation).

Saburo Takahashi, et al., "Metric Selection Mobile Ad Hoc Routing Protocol Based on Link and Node Costs", Technical Report of IEICE, NS 2003-80, RCS 2003-103, Jul. 2003, pp. 67-72 (with English Abstract).

\* cited by examiner

WIRELESS COMMUNICATIONS APPARATUS, AND ROUTING CONTROL AND PACKET TRANSMISSION TECHNIQUE IN WIRELESS NETWORK

FIELD OF THE INVENTION

The present invention generally relates to an ad-hoc network consisting of multiple wireless nodes mutually connected via wireless links to structure a self-configured backbone network. More particularly, the present invention relate to routing control for determining the optimum route in the ad-hoc network by taking into account both the node cost and the link cost, and to packet transmission capable of reducing delay at nodes due to relay traffic.

BACKGROUND OF THE INVENTION

An ad-hoc network is a technique for self-configuring a communications network with multiple communications equipment sets that operates without a specific control station.

A wireless ad-hoc network is adapted to realize the ad-hoc network technique using radio links or wireless links in the mobile environment, and many studies and much research have been conducted regarding to the wireless ad-hoc network.

It is proposed to introduce the concept of a spanning tree, which is generally used in a wired network, into a wireless ad-hoc network when connecting communications apparatuses or access points via wireless links. (See, for example, JP 2000-69046A publication.) It is also proposed to prevent a loop to avoid wasteful packet relay when creating a spanning tree in a wireless network. (See, for example, JP 2000-78147A publication and JP 2003-188811A publication.)

Since ad-hoc networks are established in a self-configuring manner by communications apparatuses, if workload is concentrated on a specific communications apparatus, the influence spreads to all the apparatuses that transmit and receive data via that specific communications apparatus. In the above-described publications JP 2000-69046A and JP 2000-78147A, workload concentrates on a specific wireless base stationbase station located at the root of the tree, and therefore, the throughput of the entire network is reduced.

On the other hand, JP 2003-188811A proposes to maintain the communication quality by not establishing a channel with respect to a wireless base stationbase station with a low receive-power level when creating a tree. However, this method is not capable of calculating a link cost reflecting adaptive changes in communication rate in the wireless environment. Consequently, the throughput of the entire network cannot be improved.

To avoid the concentration of workload on specific equipment, it is proposed to use the workload on a communications apparatus as an indicator when performing routing control in an ad-hoc network. See, for example, Sung-Ju Lee and Mario Gerla, "Dynamic Load-Aware Routing in Ad hoc Networks", Proc. ICC 2001, June, 2001. Also, see Hakoda, et al. "Performance Evaluation of Mobile Ad Hoc Routing Protocols Based on Link Expiration time and Load of Node", IEICE Journal, Vol. 85-B, No. 12, 2002.

It is also proposed to switch between a link cost, which represents communication available time between terminals, and a node cost, which represents the busy rate of a terminal, depending on the network traffic. See Takahashi, et al., "Metric Selection Mobile Ad Hoc Routing Protocol Based on Link and Node Costs", Technical Report of IEICE, NS 2003-80, RCS2003-103 (2003-7) at 67-72.

With the above-described conventional techniques, load distribution cannot be realized in the network. Or, even if workload is dispersed, efficient use of radio resources cannot be realized.

SUMMARY OF THE INVENTION

Therefore, it is an object of the present invention to solve the problems in the conventional techniques and to provide a routing control and packet transmission technique for a wireless network that can achieve both workload distribution among nodes and efficient use of radio resources.

The technology aimed by the present invention may fall in between mobile ad-hoc consisting of only mobile terminals without a specific control station and an infrastructure network requiring a control station; however, it is also applicable to mobile ad-hoc. Wireless communications apparatuses form a wireless backbone network in a self-configuring manner, each apparatus behaving like a wireless base station or an access point to control user terminals existing under the communications apparatus.

In order to realize both efficient use of the radio resources and distribution of workload in the network, a node cost is calculated, in addition to a link cost, at each of the wireless communications apparatuses in the network to take the node traffic into account. The node cost can be calculated based on the amount of data accumulated in the buffer or queue time. The calculated node cost is added to the link cost representing the state of the radio environment to obtain the total cost required to reach the destination of a packet. In other words, the packet transmission route is determined taking into account both the node cost and the link cost.

Independent of or in combination with the calculation of the node cost, a wireless communications apparatus (AP) is configured to have a backbone-system buffer for temporarily storing packets received from other nodes (or access points) and an access-system buffer for temporarily storing packets received from user terminals (STA) located under this wireless communications apparatus (AP) separately. Data transmission from these two buffers is scheduled based on a prescribed order of priority so as to reduce delay occurring at a node (wireless communications apparatus or access point) on which traffic is likely to converge.

In one aspect of the invention, a wireless communications apparatus used in a wireless communications network consisting of multiple wireless communications apparatuses mutually connected via wireless links is provided. The wireless communications apparatus comprises:

(a) a buffer configured to temporarily store information received from an adjacent wireless communications apparatus or a user terminal located under the wireless communications apparatus;

(b) a routing control information processing unit configured to estimate a node cost representing traffic at the wireless communications apparatus and a link cost representing a radio condition of the link to determine a transmission route based on cost information reflecting both the node cost and the link cost; and (c) a routing control unit configured to designate a next hop to which a data item accumulated in the buffer is to be transmitted according to the determined transmission route.

By determining the transmission route based on both the link cost representing the wireless condition between adjacent wireless communications apparatuses and the node cost representing the traffic at the node, concentration of workload on a specific node can be avoided, while efficiently using the radio resources. Consequently, wireless transmission can be performed more efficiently.

Preferably, the routing control information processing unit is configured to exchange the cost information with the adjacent wireless communications apparatus, and upon receiving arbitrary cost information, to produce new cost information by adding the node cost of this wireless communications apparatus and the link cost from the adjacent wireless communications apparatus and transmit the new cost information to the next hop.

By allowing the wireless communications apparatus to exchange the cost information including the node cost and the link cost with other wireless communications apparatuses in the wireless network, a route can be determined in a self-configured manner, taking into account both the radio environment and the node traffic.

In another aspect of the invention, a wireless communications apparatus, which is used in a wireless communications network consisting of multiple wireless communications apparatuses mutually connected via wireless links, comprises:

(a) a first buffer configured to temporarily store a first information item received from an adjacent wireless communications apparatus;
(b) a second buffer configured to temporarily store a second information item received from a user terminal located under the wireless communications apparatus;
(c) a priority control unit configured to schedule transmission of the first information item and the second information item according to transmission priority; and
(d) a routing control unit configured to determine a transmission route for the first information item and/or the second information item if they are required to be transmitted to a next hop, based on cost information including a node cost representing traffic at the wireless communications apparatus and a link cost representing the radio condition of the link.

By storing information items in two types of buffers depending on where the information items are received from, and by controlling the transmission order of the information items, the packets can be relayed to the next hop without causing a significant delay even at a node on which traffic is apt to converge.

In addition, for the information items needing to be transmitted to the next node, the transmission route is determined based on the cost information taking both the node cost and the link cost into account.

With this arrangement, concentration of workload on a specific node can be avoided, and the overall network efficiency can be maintained high by setting a suitable transmission route avoiding a heavy-traffic node. Consequently, radio resources can be used efficiently.

BRIEF DESCRIPTION OF THE DRAWINGS

Other objects, features, and advantages of the invention will become more apparent from the following detailed description when read in conjunction with the accompanying drawings, in which.

DETAILED DESCRIPTION OF THE PREFERRED EMBODIMENT

The present invention is described in detail below in conjunction with the attached drawings.

Figure 1:
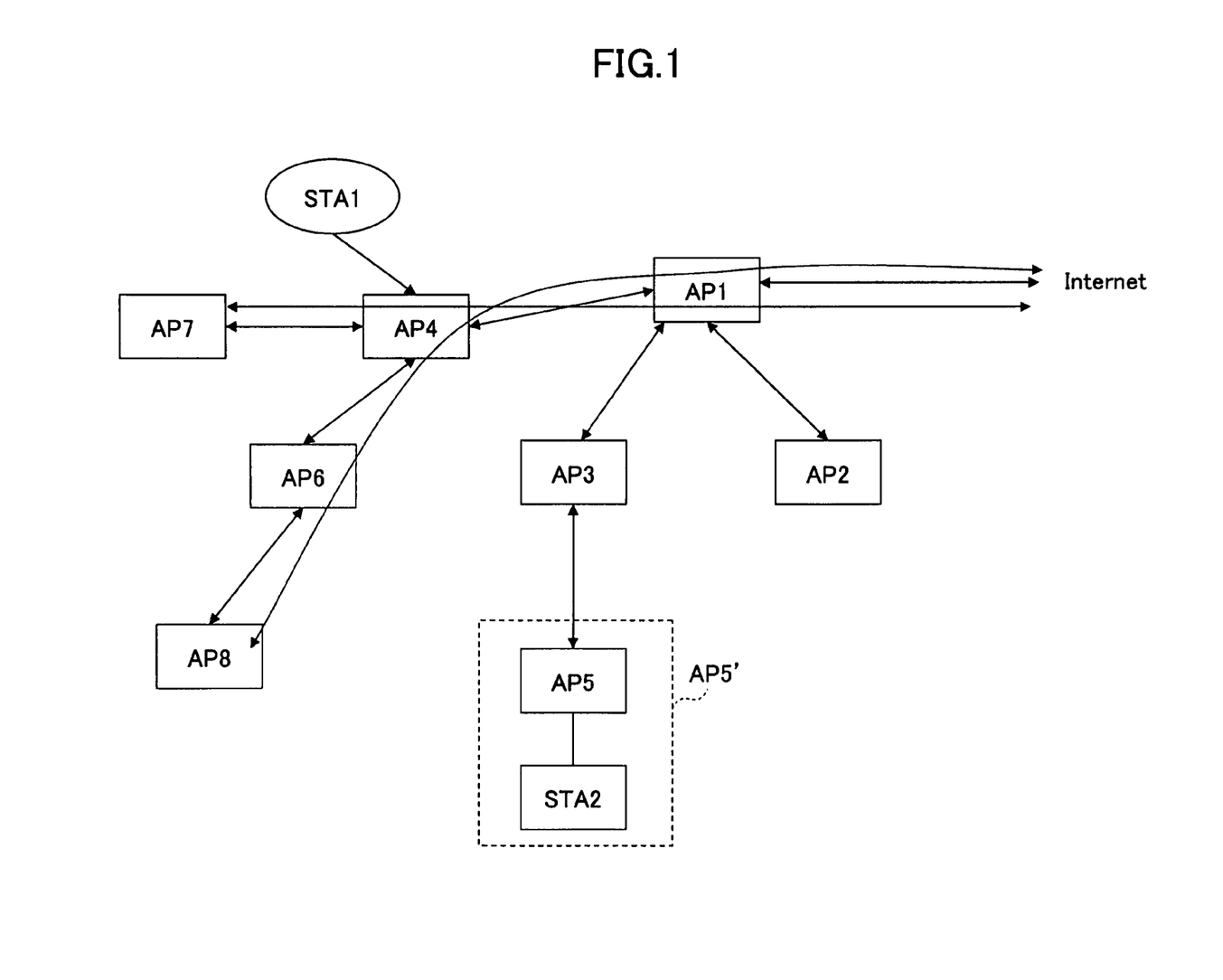
FIG. 1 illustrates an example of an ad-hoc network structured by multiple access points (wireless communications apparatuses), to which the present invention is applied.

FIG. 1 is a schematic diagram illustrating an example of the network configuration of an ad-hoc network including multiple access points (wireless communications apparatus) AP1-AP8 that function as wireless base stations structuring a wireless backbone network. In addition, all or some of the access points AP1-AP8 function as wireless base stations controlling user terminals (STA) located under the associated access points. The access points AP1-AP8 are mutually connected via wireless links to form the wireless backbone network. A user terminal STA1 is located under the access point AP4, and another user terminal STA2 is connected to the access point AP5 via a cable in this example. The access point AP5 and the user terminal STA2 are integrated with each other to function as a single apparatus AP5'. Although not shown in FIG. 1, there may be some user terminals existing under each or some of the access points.

In the specification, a "node" or an "access point" means a communications apparatus that has a packet relaying function and behaves as a wireless base station, and a "user terminal" means communications equipment that does not have a packet relaying function. The apparatus AP5' in FIG. 1 functions as both an access point and a user terminal, and it is, for example, a fixed television set or a mobile terminal with ability of access point. The apparatus AP5' is a part of the wireless backbone network.

In FIG. 1, the apparatus AP1 functions not only as an access point, but also as a gateway to the wired Internet. Adjacent access points connected by the bi-directional arrows transmit and receive data items according to the tree extending from access point AP1 functioning as the root. The root AP is not limited to access point AP1, but two or more transmission trees may be produced dynamically in the network, designating two or more root APs (access points).

When access points AP6, AP7, and AP8 transmit or receive data items to or from the wired network, such data items have to pass through AP4 connected to the gateway point AP1. If, in this state, user terminal STA1 located under AP4 is transmitting or receiving a large amount of data, congestion occurs at AP4, and the data items routed through AP4 will be delayed greatly.

To prevent such a delay in the wireless network, each of the access points AP1-AP8 is configured to schedule transmission of data items received from other access points (AP) or the user terminal (STA) located under the access point, according to a prescribed order of priority. In addition, each of the access points AP1-AP8 is configured to determine a transmission route, based on the cost value reflecting the node cost representing traffic at that access point and the link cost representing the radio conditions of the wireless link, as necessary.

Figure 2:
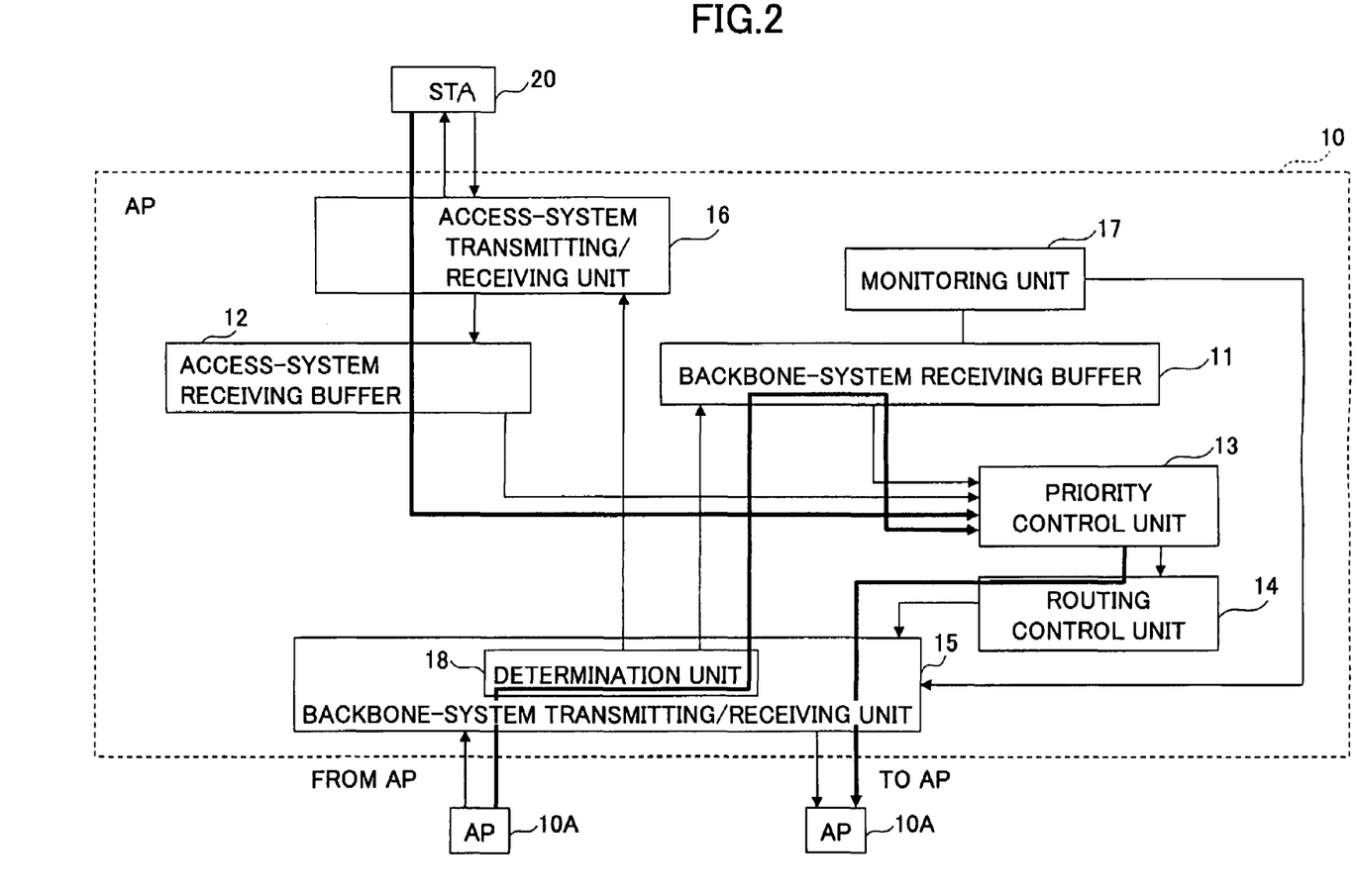
FIG. 2 is a block diagram of a wireless communications apparatus (AP) according to an embodiment of the invention.

FIG. 2 is a schematic block diagram of an access point (AP) or wireless communications apparatus 10 according to an embodiment of the invention. The access point 10 has a backbone-system receiving buffer 11 for temporarily storing data items received from other access points 10A, and an access-system receiving buffer 12 for temporarily storing a data item received from the user terminal (STA) 20 located under the access point 10. A priority control unit 13 schedules transmission of the data items from these two buffers 11 and 12, according to prescribed transmission priority. A routing control unit 14 designates transmission routes for the data items accumulated in the receiving buffers 11 and 12. The routing control unit 14 may be configured so as to carry out cost estimation. In this case, the routing control unit 14 determines the transmission route, as necessary, based on the estimated cost value reflecting both the node cost and the link cost. The details of estimation of the cost value are described below.

The access point 10 also has a backbone-system transmitting/receiving unit 15 for transmitting and receiving data items to and from other access points 10A, and an access-system transmitting/receiving unit 16 for transmitting and receiving data items to and from user terminals (STA) located under the access point 10.

The backbone-system transmitting/receiving unit 15 has a determination unit 18 for determining the destination of the received packet (data item). If the packet is to be transmitted to the next node of the backbone network, the data item is stored in the backbone-system receiving buffer 11. If the received packet is addressed to the user terminal (STA) 20 located under the access point 10, then the data item is transmitted via the access-system transmitting/receiving unit 16 to the user terminal (STA) 20, without being supplied to the backbone-system receiving buffer 11.

Although, in the example shown in FIG. 2, two separate radio interfaces (backbone-system transmitting/receiving unit 15 and access-system transmitting/receiving unit 16) are used, a single interface may be used to implement the embodiment. In this case, the received packets can be sorted to the backbone-system receiving buffer 11 and the access-system receiving buffer 12 by checking the source addresses of the received packets.

Referring to FIG. 1, the data item transmitted from AP6 to the Internet is received at the backbone-system transmitting/receiving unit 15 of AP4, which node is to relay the data item to the next node, and stored in the backbone-system receiving buffer 11. There is a user terminal STA1 that is currently transmitting a large amount of data, which data are stored in the access-system receiving buffer 12 of AP4, via the access-system transmitting/receiving unit 16. Because the backbone-system receiving buffer 11 and the access-system receiving buffer 12 are provided separately, the backbone-system buffer 12 can accept the relay traffic from other access points 10A without delay, even if the data items to be accumulated in the access-system receiving buffer 12 are about to exceed the capacity of the access-system receiving buffer 12.

The transmission priority may be given to, for example, data transmission from the backbone-system receiving buffer 11, or alternatively, the transmission ratio of the backbone-system receiving buffer 11 to the access-system receiving buffer 12 may be set to 2/1 (2 to 1). The transmission priority may be determined in advance by a network manager, or automatically determined in a variable manner based on the past record of data.

By outputting data items received from the backbone network at a prescribed rate, the data items being relayed to the destination are appropriately transmitted to the next node even if a large amount of data is input from the user terminal (STA) 20 located under the access point 10. With this arrangement, delay occurring at an access point at which traffic is likely to converge can be reduced, while efficiently using the network resources.

At least one of the backbone-system receiving buffer 11 and the access-system receiving buffer 12 may be segment according to the types of the data items.

Figure 3:
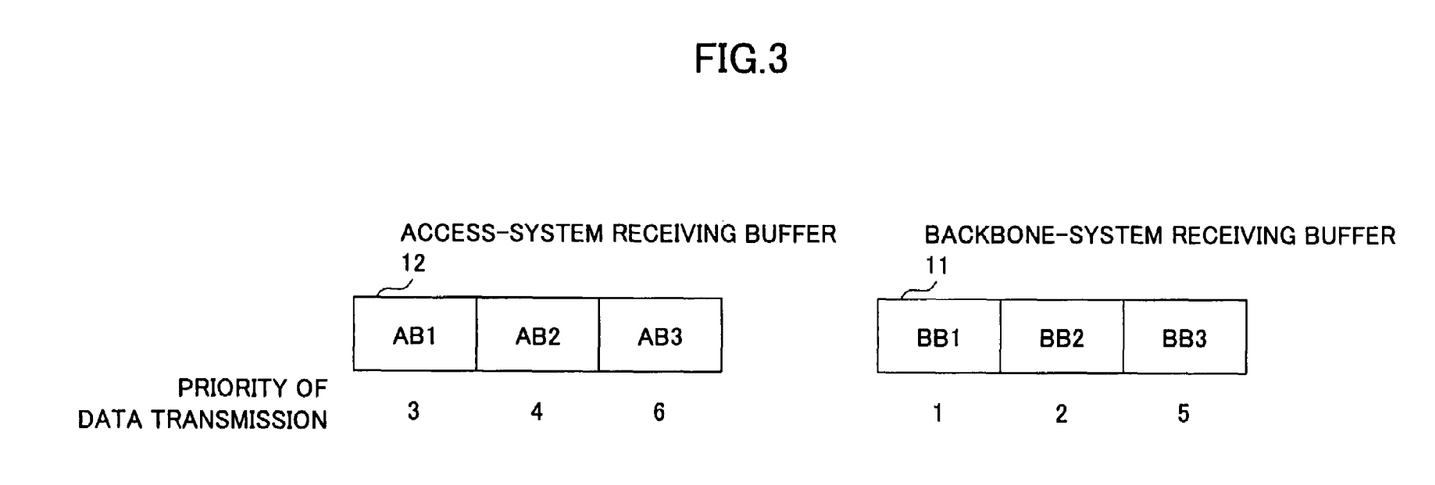
FIG. 3 illustrates an example of priority control using segmen buffers.

FIG. 3 illustrates an example of transmission priority for the segment buffer structure. The backbone-system receiving buffer 11 is divided into three portions BB1, BB2, and BB3. The access-system receiving buffer 12 is divided into three portions AB1, AB2, and AB3. The buffer segments BB1 and AB1 are used to temporarily store data items, such as audio data, for which transmission delay is not acceptable. The buffer segments BB2 and AB2 are used to store data items with less strict delay criteria. The buffer segments BB3 and AB3 are used to store data items for which a certain degree of transmission delay is acceptable.

When transmitting data items stored in the segment buffers, transmission priority control is performed. For example, the data items are taken out of the buffer segments BB1 and BB2 of the backbone-system receiving buffer and transmitted in this order. Then, the data item stored in the buffer segments AB1 and AB2 of the access-system receiving buffer 12 are extracted and transmitted in this order. Then, the data items in the buffer segments BB3 and AB3 are taken out and transmitted in this order. Alternately, although not shown in FIG. 3, the data items may be extracted and transmitted in the order of BB1, AB1, BB2, BB3, AB2, and AB3.

By setting transmission priority using segment buffers, the data items with higher priority can be transmitted in the appropriate order even if such data items are accumulated in the access-system receiving buffer 12. In other words, data items stored in the access-system receiving buffer 12 may be placed in the transmission buffer ahead of data items in the backbone-system receiving buffer 11 as long as higher priority is given to such data items. This arrangement can prevent data items, for which much delay is not acceptable, from being lost, and consequently, communication quality can be improved.

Returning to FIG. 2, the access point 10 has a monitoring unit 17' for monitoring the amount of data accumulated in the backbone-system receiving buffer 11. If the data accumulated in the backbone-system receiving buffer 11 has exceeded or is exceeding the capacity of the buffer, large delay will occur at that node. To prevent this problem, if the data accumulated in the backbone-system receiving buffer 11 have exceeded a prescribed threshold, the monitoring unit 17 transmits a message reporting the occurrence of congestion to the adjacent access points. In response to the congestion message, the adjacent access points rearrange transmission routes so as to get around the congested node. Similarly, when the access point 10 receives a congestion messages from an adjacent access point 10A, the routing control unit 14 designates the next hop according to the newly arranged transmission routes so as to avoid this node (which has transmitted the congestion message). The rearrangement of the transmission routes at the occurrence of congestion is be described below.

In the above example, workload concentrates at access point AP4 to which a large a amount of data is currently transmitted from the user terminal STA1 located under the access point AP4. The same applies to access point AP1 functioning as the gateway to the Internet because all the traffic accessing the Internet has to pass through AP1. Similarly, traffic congestion also occurs at the access point located at the boundary between adjacent blocks to link up these blocks in a network divided into multiple blocks consisting of access points.

Figure 4:
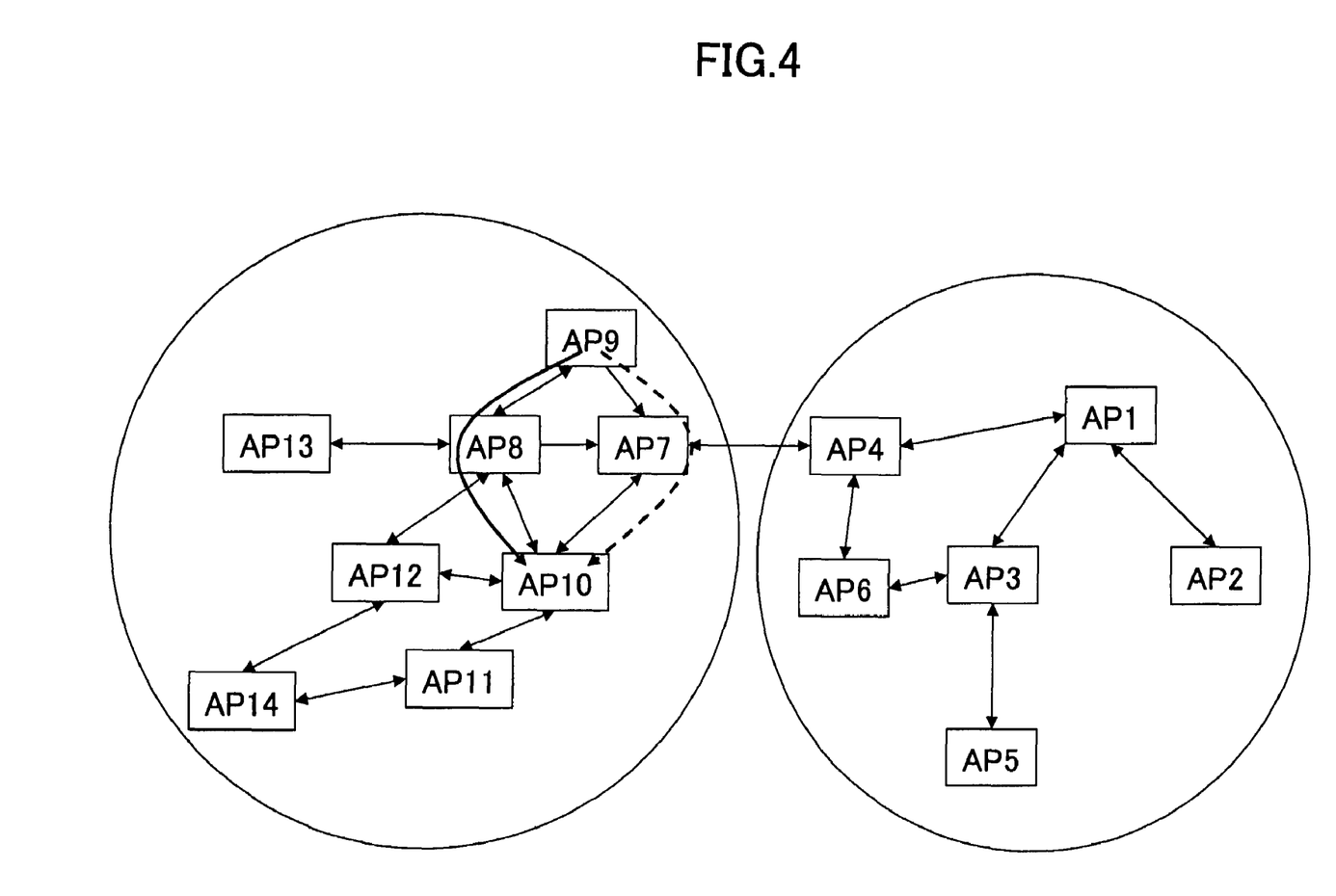
FIG. 4 illustrates an example of network topology divided into two blocks.

FIG. 4 illustrates an example of the network configuration divided into two blocks, each block being structured by multiple access points. Although not shown in FIG. 4, a user terminal (STA) may exist under the access points (AP) in each block. The access points for linking up these two blocks (that is, AP4 and AP7 in FIG. 4) are always used when transmitting data between user terminals located in different blocks. Accordingly, even if there is little traffic from the user terminal located under the link-up access point (AP4 or AP7), the backbone-system receiving buffer of the link-up access point is likely to overflow due to data transmission from other access points.

To overcome this problem, a transmission route is rearranged so as to avoid the link-up access point when a data item is addressed to a user terminal (STA) located in the same block.

For example, when transmitting data from AP9 to AP10, there are two different routes, AP9→AP7→AP10 and AP9→AP8→AP10. If traffic is converging at the link-up access point AP7, it is desired to select the latter route for reducing the workload on AP7.

In the radio environment, a bypass route is likely to reduce the transmission rate and degrade the performance of the overall system. Accordingly, it is required to select an alternative route so as to avoid the congested node with as little bypass (detour) as possible. To realize this, the alternative route is selected taking both the node traffic and the radio environment between adjacent nodes (AP) into account in the embodiment.

If a spanning tree protocol standardized in IEEE 802.1D is employed in routing control, each access point writes a cost required from the root node (AP) of the tree in the routing control packet (e.g., bridge protocol data unit: BPDU) transmitted at prescribed intervals.

In this embodiment, a cost value reflecting both a node cost representing the traffic of the node and a link cost representing the radio conditions is written in the routing control packet (BPDU), which is transmitted along the tree in the network. The cost value written in the BPDU may be estimated based on the expression, Cost = (cost representing the node traffic) ×

(cost representing the radio conditions)

or

Cost = (cost representing the node traffic) +

(cost representing to the radio conditions).

The cost may be normalized by multiplying by an appropriate coefficient.

The node cost representing the node traffic may be determined from the amount of data accumulated in the receiving buffer or the queue time. The link cost representing the radio conditions may be determined from the data transmission rate (link rate) or the condition (including the intensity) of radio waves.

By selecting the node (AP) so as to minimize the cost value, an alternative route with as little bypass as possible can be selected in a self-directed manner, while avoiding a node on which workload is converging.

Figure 5:
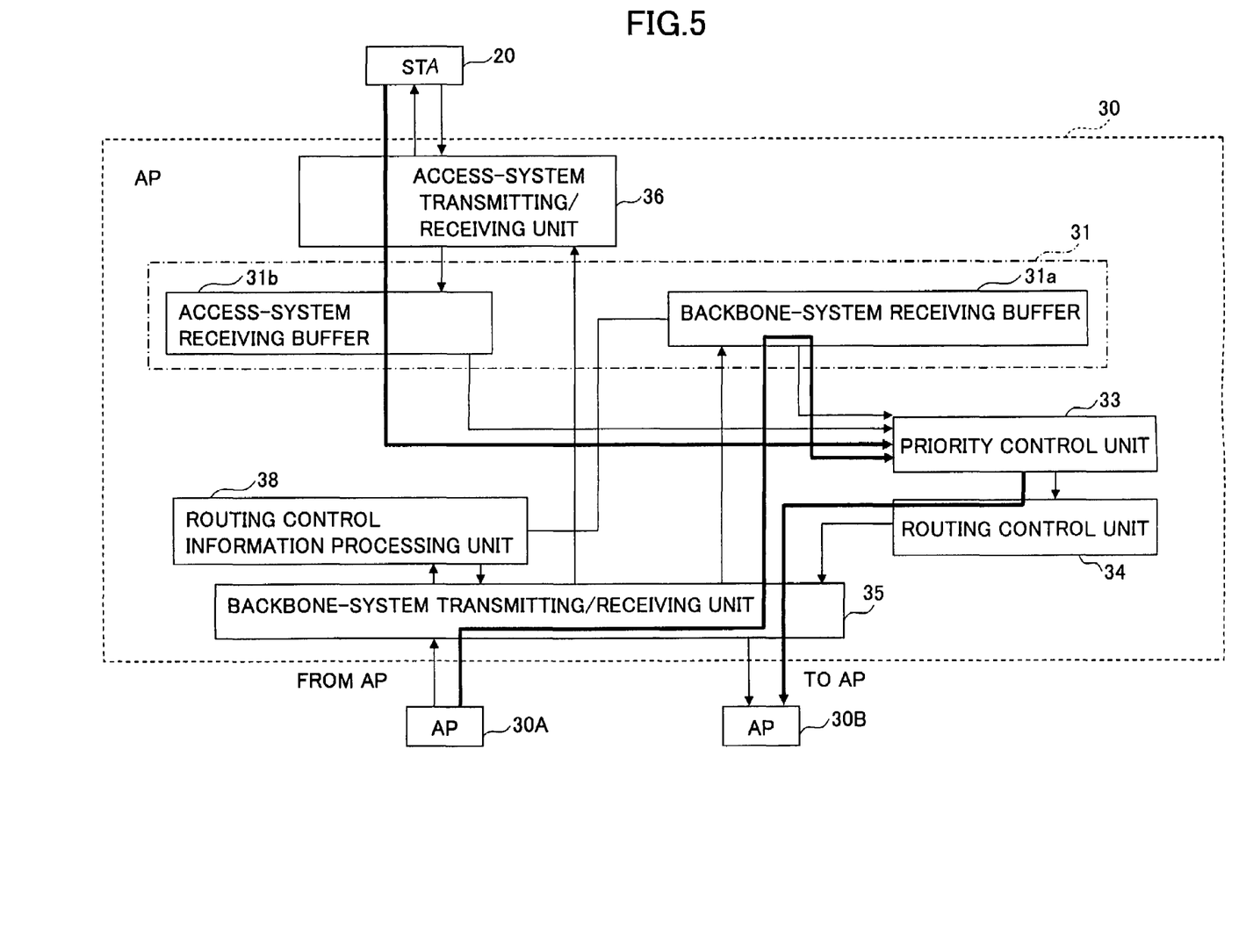
FIG. 5 is a block diagram of a wireless communications apparatus (AP) according to another embodiment of the invention.

FIG. 5 is a block diagram illustrating a wireless communications apparatus (or an access point) 30 with a cost estimation function. The access point (AP) 30 has a receiving buffer 31, a routing control information processing unit 38, and a routing control unit 34. The receiving buffer 31 temporarily stores data items received from the user terminal 20 located under the access point 30 and/or another access point 30A. The routing control information processing unit 38 estimates a node cost representing the traffic at this node and a link cost representing the radio conditions, and determines a transmission route based on the cost value reflecting both the node cost and the link cost. The routing control unit 34 designates the next hop to which the data item stored in the receiving buffer is to be transmitted according to the determined route.

The routing control information processing unit 38 transmits a routing control packet to the adjacent access points at prescribed intervals. When this access point 30 receives a packet from another access point 30A, the routing control information processing unit 38 determined whether the packet is a data packet or a control packet containing control information. If the packet is a data packet, the packet is temporarily stored in the backbone-system receiving buffer 31a.

The determination between data and control information may be performed at the determination unit (not shown in FIG. 5) provided in the backbone-system transmitting/receiving unit 35, as illustrated in FIG. 2. In this case, if the packet is determined to be a data packet, the data item is supplied to the backbone-system receiving buffer 31a; if determined to be control information, the packet is supplied to the routing control information processing unit 38.

Upon receiving the control packet, the routing control information processing unit 38 estimates a node cost according to the amount of data accumulated in the receiving buffer 31 (backbone-system receiving buffer 31a) and a link cost according to the radio condition of the link between this access point 30 and the previous node (AP). A monitoring unit illustrated in FIG. 2 may be provided in the access point 30 so as to determine the amount of data accumulated in the receiving buffer 31.

The routing control information processing unit 38 determines a cost value by, for example, multiplying the node cost by the link cost, or alternatively, adding the node cost to the link cost. The determined cost value is added to the current cost value contained in the control information to produce a total cost value required from the source node (AP) that generated the routing control packet to this node 30. The produced total cost value is compared with another total cost value produced based on the routing control packet generated by the source node and received from another route to select the lower value. The selected total cost value is written in the routing control packet.

Figure 6:
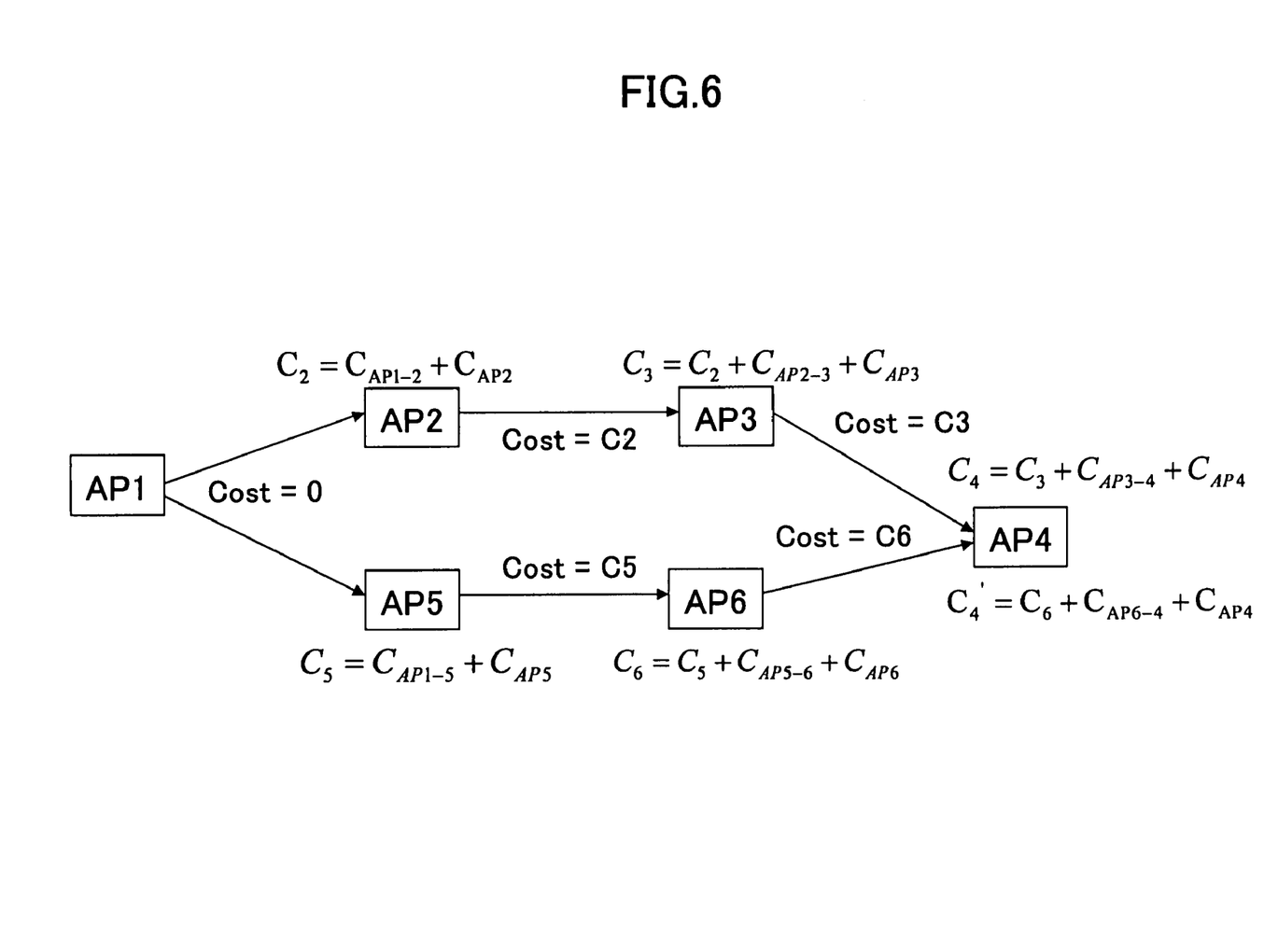
FIG. 6 is a diagram used to explain cost estimation.

FIG. 6 illustrates an example of the above-described cost estimation. In this example, AP1 is the source node that originally generates a routing control packet, and it transmits the routing control packet with cost value of zero. The routing control packet is then received at AP2 and AP5. Access point AP2 determines cost C2 by adding the link cost $C_{AP1-2}$ representing the radio condition (for example, the transmission rate) between AP1 and AP2 to the node cost $C_{AP2}$ representing the traffic (for example, the amount of data currently accumulated in the receiving buffer). The AP2 writes the cost value C2 in the routing control packet and transmits the packet to adjacent access points.

Access point AP3 received the routing control packet from AP2, and determines the total cost C3 from AP1 to AP3 by adding the link cost $C_{AP2-3}$ between this node and the previous node AP2 and the node cost $C_{AP3}$ representing the node traffic at AP3. The routing control packet containing the cost value C3 is transmitted to adjacent access points. Access point AP4 that has received the routing control packet performs the same process to determine the total cost C4.

On the other hand, the access point AP4 also receives a routing control packet via another route through access points AP5 and AP6, which nodes receive the routing control packet from the source node AP1 and perform the above-described operations. The access point AP4 determines the total cost value C4' for this route.

The routing control information processing unit 38 compares the total cost value C4' with the previously determined total cost value C4. If the newly determined total cost value C4' is smaller than the other cost value C4, the routing control information processing unit 38 rewrites the currently determined total cost value C4' over the previously determined total cost value C4 in the routing control packet. The access point AP4 then transmits the routing control packet to adjacent access points (not shown), while it records the previous node AP6 as the next hop for the path leading to the access point A1 according to the selected route. The next hop on the route reaching AP1 is reported to the routing control unit 34. This information is used when the access point AP4 receives a packet addressed to AP1 or the user terminal located under AP1.

Although comparison of the total cost values for different routes, rewriting of the total cost value, and recording of the next hop are explained in conjunction with AP4, the same operations are performed at each of the access points AP2, AP3, AP5, and AP6 to select a route with the lowest cost in a self-directed manner. All the nodes (or access points) cooperate with each other to perform the above-described operations in a self-directed manner to build up the optimum route taking into account both the traffic at each node and the radio conditions of the wireless links.

When relaying packets, the routing control unit 34 designates the next hop, to which the data items temporarily stored in the receiving buffer 31 are to be transmitted, according to the lowest-cost route, and the data items (packets) are transmitted via the backbone-system transmitting/receiving unit 35.

Although in FIG. 5 two radio interfaces (backbone-system transmitting/receiving unit 35 and the access-system transmitting/receiving unit 36) and two buffers (backbone-system receiving buffer 31a and access-system receiving buffer 31b) are used, the above-described routing control can be realized using a single radio interface and a single buffer.

The routing control based on both the node cost and the link cost may be combined with the transmission priority control using the independently provided backbone-system receiving buffer and access-system receiving buffer illustrated in FIG. 2 and FIG. 3. By combining these two features, prevention of workload concentration and efficient use of the network resources can be realized more effectively.

This patent application is based on and claims the benefit of the earlier filing dates of Japanese Patent Application No. 2004-119288 filed Apr. 14, 2004, the entire contents of which are hereby incorporated by reference.

What is claimed is:

1. A wireless communication apparatus of a wireless communications network including multiple wireless communications apparatuses mutually connected via wireless links, the wireless communication apparatus comprising:
   a first buffer configured to store information received from an adjacent wireless communication apparatus;
   a second buffer configured to store information received from a user terminal controlled by the wireless communications apparatus;
   a routing control information processing unit configured to determine a node cost according to an amount of the information accumulated in the first buffer and the second buffer and a link cost of a transmission path between the wireless communications apparatus and the adjacent wireless communications apparatus, to produce cost information from the node cost and the link cost, and select a transmission path to a destination wireless communications apparatus for the information extracted from the first buffer such that the cost information of the selected transmission path is minimum in possible transmission paths to the destination wireless communications apparatus; and
   a routing control unit configured to designate a next hop in the selected transmission path to transmit the extracted information.

2. The wireless communication apparatus of claim 1, wherein the routing control information processing unit exchanges the cost information with adjacent wireless communication apparatuses in the network, and when receiving arbitrary cost information from one of the adjacent wireless communications apparatuses, the routing control information processing unit produces new cost information taking into account the node cost of the wireless communications apparatus and the link cost of a wireless link from said one of the adjacent wireless communications apparatuses, and transmits the new cost information to the adjacent wireless communications apparatuses.

3. A wireless communication apparatus of a wireless communications network including multiple wireless communications apparatuses mutually connected via wireless links, comprising:
   a first buffer configured to store a first information received from an adjacent wireless communication apparatus;
   a second buffer configured to store a second information item received from a user terminal controlled by the wireless communications apparatus;
   a priority control unit configured to schedule transmission of the first information and the second information i-tern according to transmission priority, the transmission priority assigning higher priority to transmission of a predefined percentage of the first information from the first buffer over transmission of the second information from the second buffer; and
   a routing control information processing unit configured to determine a node cost according to an amount of the first information accumulated in the first buffer and the second buffer and a link cost of a transmission path between the wireless communications apparatus, to produce cost information from the node cost and the link cost, and select a transmission path to a destination wireless communications apparatus for the first information extracted from the first buffer such that the cost information of the selected transmission path is minimum in possible transmission paths to the destination wireless communications apparatus; and
   a routing control unit configured to designate a next hop in the selected transmission path to transmit the extracted first information.

4. The wireless communication apparatus of claim 3, wherein at least one of the first buffer and the second buffer includes a plurality of buffer segments according to types of information to be transmitted, and the priority control unit schedules the transmission of the first and second information based on the priority of the buffer segments.

5. The wireless communication apparatus of claim 3, wherein the priority control unit schedule the transmission of the first and second information by variably controlling the transmission ratio of the first information stored in the first buffer to the second information stored in the second buffer.

6. The wireless communications apparatus of claim 3, further comprising:
   a monitoring unit configured to monitor the amount of the first information accumulated in the first buffer and if the information amount exceeds a prescribed threshold, to report occurrence of congestion to adjacent wireless communications apparatuses; wherein
   when receiving a message reporting occurrence of congestion from another wireless communications apparatus, the routing control unit designates a transmission route bypassing said other wireless communications apparatus at which the congestion has occurred.

7. The wireless communications apparatus of claim 3, further comprising:
   a determination unit configured to determine a destination of the first information, to allow the first information to be temporarily stored in the first buffer if the first information is to be transmitted to the adjacent wireless communication apparatus, and to allow the first information to be delivered to the user terminal if the first information is addressed to the user terminal.

8. A packet transmission method employed in a wireless network defined by a plurality of wireless communications apparatuses mutually connected via wireless links, comprising:
   receiving first information at a wireless communication apparatus from an adjacent wireless communication apparatus and storing the first information in a first buffer;
   receiving second information at the wireless communication apparatus from a user terminal controlled by the wireless communication apparatus and storing the second information in a second buffer;
   scheduling transmission of the first information and the second information based on prescribed transmission priority; and, the transmission priority assigning higher priority to transmission of a predefined percentage of the first information from the first buffer over transmission of the second information from the second buffer;
   determining a node cost according to an amount of the first information accumulated in the first buffer and the second buffer and a link cost of a transmission path between the wireless communications apparatus and the adjacent wireless communications apparatus;
   producing cost information from the node cost and the link cost;
   selecting a transmission path to a destination wireless communications apparatus for the first information extracted from the first buffer such that the cost information of the selected transmission path is minimum in possible transmission paths to the destination wireless communications apparatus; and
   designating a next hop in the selected transmission path to transmit the extracted first information.

* * * * *